United States Patent [19]
Fjarlie

[11] 3,822,834
[45] July 9, 1974

[54] CABLE TRANSFER APPARATUS

[75] Inventor: Robin Lent Ibsen Fjarlie, Maxville, Ontario, Canada

[73] Assignee: Fathom Oceanology Limited, Port Credit, Ontario, Canada

[22] Filed: May 17, 1973

[21] Appl. No.: 361,319

[30] Foreign Application Priority Data
June 5, 1972 Canada.............................. 143836

[52] U.S. Cl.............................................. 242/54 R
[51] Int. Cl............................................. B65h 75/00
[58] Field of Search............ 242/54 R, 47.08, 47.12, 242/45.5, 85, 86, 86.1

[56] References Cited
UNITED STATES PATENTS
| | | | |
|---|---|---|---|
| 3,120,355 | 2/1964 | Bowman | 242/54 R X |
| 3,128,857 | 4/1964 | Walton | 242/54 R X |
| 3,539,123 | 11/1970 | Shutt | 242/54 R |
| 3,545,693 | 12/1970 | Gyrner | 242/54 R |

*Primary Examiner*—John W. Huckert
*Assistant Examiner*—Edward J. McCarthy

[57] ABSTRACT

A cable transfer apparatus for transferring cable from a driven rotatable drum to a static drum, includes a rotatable arm mounted on the same shaft with the rotatable and static drums, and with a transfer sheave at the outer end of the arm. The transfer sheave is mounted so as to accommodate cable being transferred between the rotatable and static drums. The arm is arranged with driving means therefor so that when the rotatable drum is driven in a first direction, the arm tends to not rotate; and when the rotatable drum is driven in the second direction, the arm tends also to rotate in that second direction at the same rotational speed. Friction means co-act between the arm and the rotatable drum so that when the drum is driven in the first direction and cable is being transferred between the driven and static drums, the friction means acts to maintain tension in the cable and to drive the arm and sheave to rotate about the shaft in the first direction; and when the rotatable drum is driven in the second direction, the friction means acts together with the tension in the cable being transferred between the drums to retard the speed of rotation of the arm and sheave about the shaft.

Three embodiments are shown. In the first embodiment, a plate is provided with clutches between the plate and the rotatable drum and between the plate and the shaft; and the rotatable arm is frictionally coupled to the plate by friction pads. In the second embodiment a bearing sleeve is provided, together with ratchet and pawl means between the bearing sleeve and each of the rotatable and static drums. The rotatable arm is frictionally coupled to the bearing sleeve. In the third embodiment, a pair of opposed clutch assemblies is provided, each having a friction clutch and an overrunning clutch; and having a toothed belt extending from one of the rotatable or static drums to one of the clutch assemblies so that it overruns in one direction and drives against the friction clutch in the other direction of rotation of the rotatable drum, and vice versa.

10 Claims, 9 Drawing Figures

PATENTED JUL 9 1974

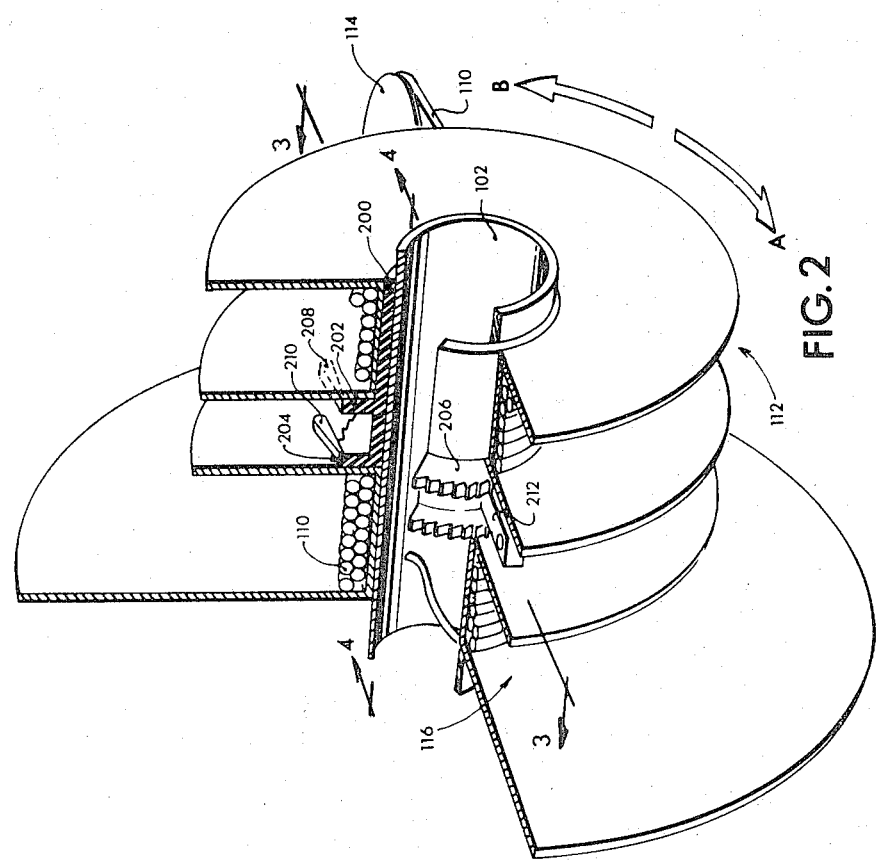

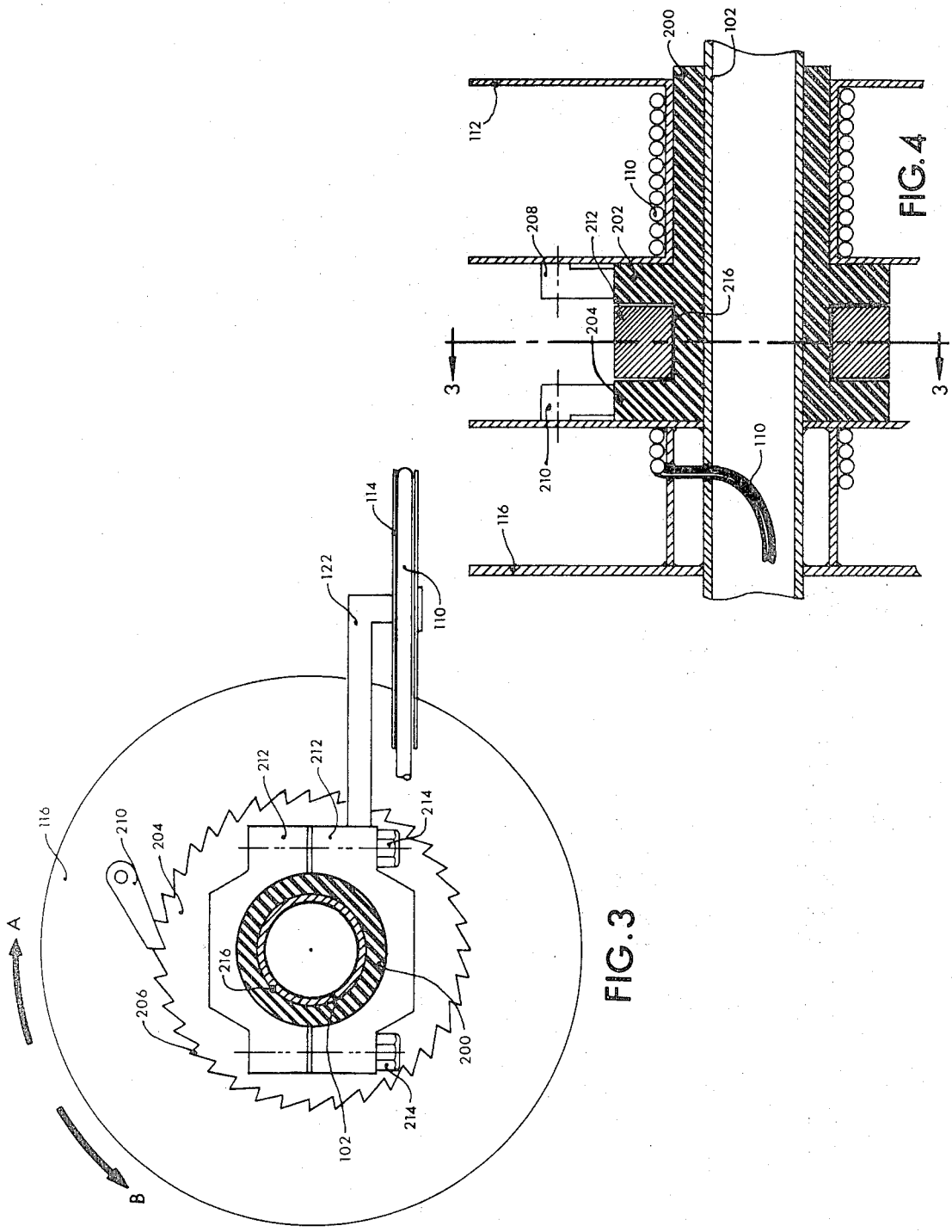

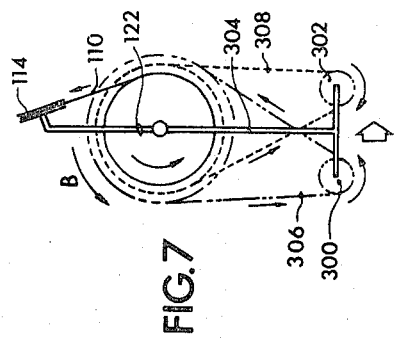
FIG.7
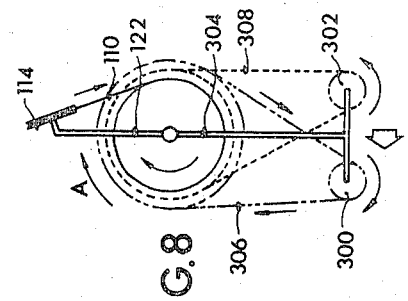
FIG.8
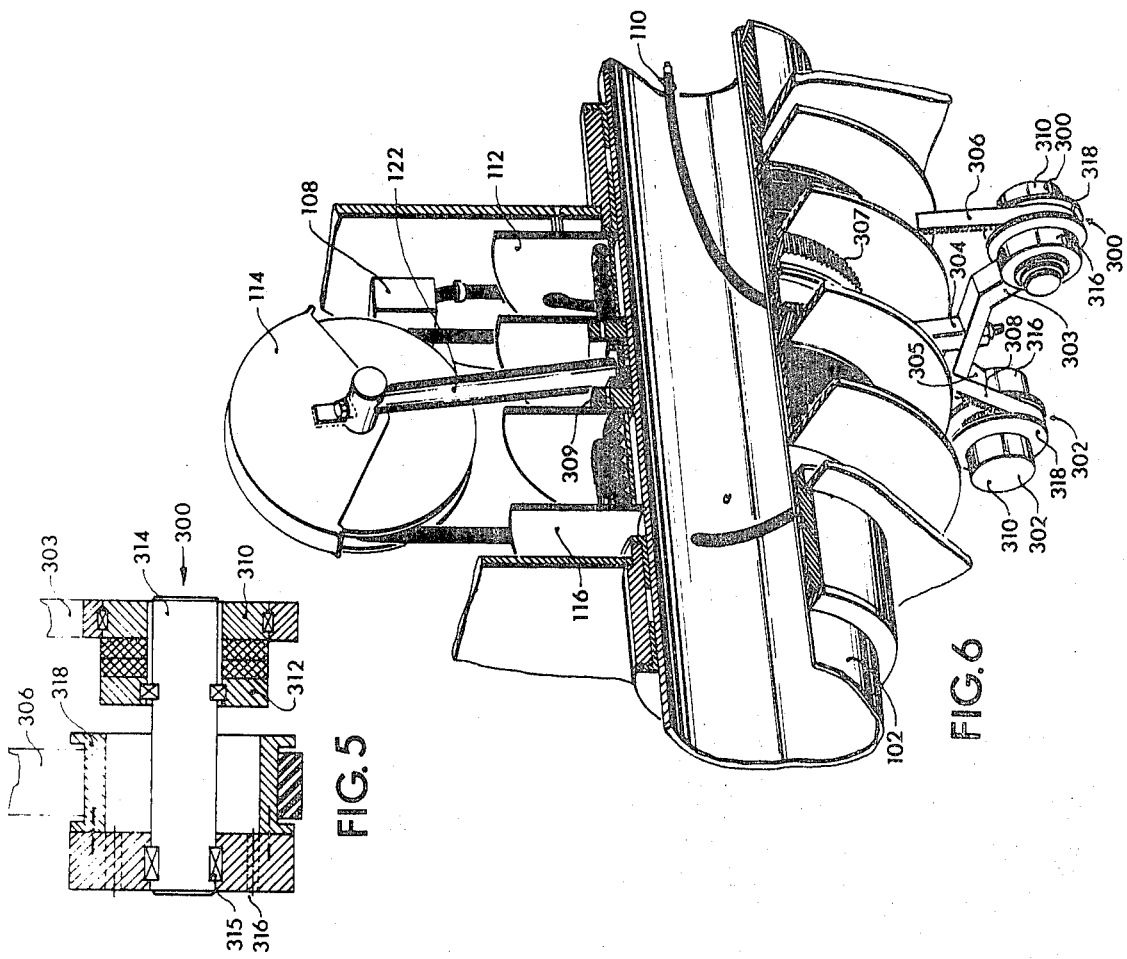
FIG.5
FIG.6

3,822,834

CABLE TRANSFER APPARATUS

FIELD OF THE INVENTION

This invention relates to an apparatus for transferring cable from a driven rotatable drum to an undriven static drum. The invention is particularly related to such apparatus which is adapted for use when the cable is an electric cable having signal voltages impressed thereon; but the invention relates in the broader sense to cable transfer apparatus where the cable is, in fact, a flexible gas or fluid line or a hybrid of gas, or fluid, with electrical lines. In any event, the invention relates to such apparatus which is used to translate signals or samples from such as a rotating winch to a fixed point relative to the rotating winch without the use of slip rings.

BACKGROUND OF THE INVENTION

Usually in rotating equipment, such as a motor or a generator, and including signal transferring apparatus, slip rings having brush contacts co-operating therewith are used for the transferance of signals from a rotating member to a non-rotating member. Very often, as in the case of apparatus having a finite number of revolutions in any one direction, means have been derived for the transferance of electrical signals, gas or liquid samples, or any of them, without the use of slip rings; but when such apparatus is installed in an environment such as the interior of a winch in an oceanographic apparatus, it may be subject to severe temperature fluctuations and shock loadings, as well as corrosive and other adverse environments.

In many installations where there are low current and low voltage signals, and where there may be a multiplicity of such signals, it is desirable to eliminate electrical noise. In applications which may be subject to adverse temperature and shock conditions, corrosion, or contamination, slip rings providing an interface between a rotating member and a static member between which the signals are to be transferred, may be particularly unsuitable.

It has been known to transfer electrical signals from a rotating point such as a signal junction point of a winch to a stationary point such as a signal junction point on the winch support structure, by means of a continuous signal cable which is installed between those two points. This is accomplished by means of a rotating drum which rotates with the winch and a stationary drum which remains with the winch support structure, in combination with a transfer sheave mounted so that it can orbit or rotate radially around the drum and to transfer, turn-by-turn, the continuous signal cable from one drum to the other. Thus, in one direction of rotation of the rotating drum and winch, cable is transferred from the rotating drum to the stationary drum; and conversely, cable is transferred from the stationary drum to the rotating drum when the latter is driven in the opposite direction. However, in order to control slack in the cable, it has been usual to provide a helical or "clock-spring" or similar spring means to impart a torsional bias force to the transfer sheave. Such spring means is so arranged that when the cable is being transferred in one direction between the rotating drum and the static drum, cable runs over the transfer sheave and forces it to orbit against the spring bias forces of the spring means. In like manner, when cable is being transferred in the opposite direction, slack is fed off from the feed drum and the transfer sheave is forced to rotate in the opposite direction because of the springs forces applied against it so as to take up the slack.

Spring mechanisms of this sort discussed above have, however, proved to be unsatisfactory because they are subject to fatigue and loss of spring temper. More importantly, however, it is difficult to maintain a substantially constant torque when there are a relatively large number of turns of the axis end of the torsion spring during a cable transferring operation. Thus, a finite limit is imposed on the cable transfer apparatus by the number of turns which can be accommodated by the spring.

SUMMARY OF THE INVENTION

This invention provides a cable transfer apparatus for transferring cable from a rotating drum to a static drum over a cable transfer sheave, wherein means are provided which are frictionally engaged by the one or the other of the rotatable or static drums—depending on which direction the rotatable drum is driven—and which serves to maintain cable tension at all times and which thereby accommodates cable transfer from a rotatable drum to a static drum, the limit of the number of turns to be transferred being determined by the finite storage capacity of the drums.

Another object of this invention is to provide an apparatus for transferring electrical signals or gas or liquid samples, or a combination thereof, from a point on a rotating element to a point on a static element by means of a continuous cable connected therebetween.

Still another object of this invention is to provide several differing embodiments of apparatus utilizing frictional coupling between the static and rotating drums on the one hand and the transfer sheave between them on the other hand, such that the frictional coupling acting together with cable tension serves to maintain a driving torque against suitable arm means on which the transfer sheave may be mounted.

BRIEF DESCRIPTION OF THE DRAWINGS

These and other features and objects of the present invention are discussed in greater detail hereafter, in association with the accompanying drawings, in which:

FIG. 2 is a partially fragmented perspective view of a second, preferred, embodiment of a cable transfer mechanism according to this invention;

FIG. 3 is a cross-sectional view of the apparatus of FIG. 2 taken along the line 3—3 in FIGS. 2 or 4;

FIG. 4 is a cross-sectional view of the same apparatus, taken along the line 4—4 in FIG. 2;

FIG. 5 is a cross-sectional view of a clutch assembly used in a third embodiment of this invention;

FIG. 6 is a partially fragmented perspective view of a third embodiment of a cable transfer apparatus according to this invention;

FIGS. 7 and 8 are diagramatic representations of the operation of the apparatus of FIG. 6 when the driven drum is driven in directions shown.

DESCRIPTION OF THE PREFERRED EMBODIMENTS

Figure 1:
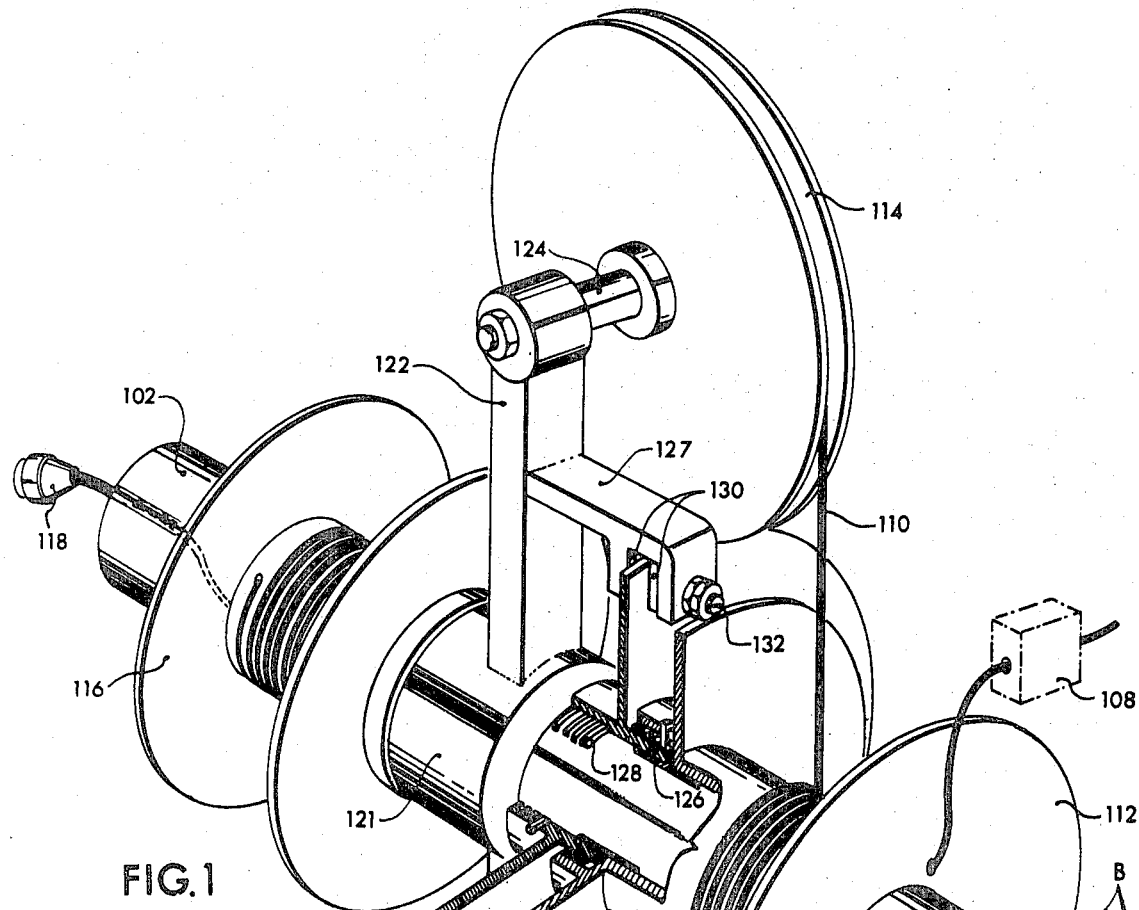
FIG. 1 is a partially fragmented perspective view of a first embodiment of a cable transfer apparatus according to this invention.

The present apparatus, in its broadest form, includes a driven rotatable drum which is generally designated at 112 and an undriven static drum which is generally designated at 116. The drums 112 and 116 are positioned along a common axis, and the axis of rotation of the rotatable drum 112 is substantially co-extensive with that common axis. The apparatus is adapted to transfer cable 110 which may be electrical cable, gas or fluid filled, or a hybrid cable. The apparatus is arranged so that cable is transferred from the static drum 116 to the rotatable drum 112 when the rotatable drum is driven in a first direction of rotation generally designated A; and so that cable is transferred from the rotatable drum 112 to the static drum 116 when the rotatable drum is driven in a second, reverse, direction of rotation which is generally designated as B. An arm 122 extends in a direction which is substantially perpendicular to the common axis of drums 112 and 116; and a transfer sheave 114 is mounted for rotation at the outer end of the arm 122 with the radial plane of the transfer sheave 114 being substantially parallel to the common axis of drums 112 and 116.

(In general, the driven rotatable drum 112 and the undriven static drum 116, together with the arm 122, are mounted on a static shaft such as shaft 102, as shown in the drawings. The axis of rotation of the drum 112 and the arm 122 is substantially co-extensive with the axis of shaft 102. The static drum 116 is secured by suitable means to the shaft 102.)

The transfer sheave 114 is mounted on arm 122 so as to accommodate cable 110 when it is being transferred between the rotatable drum 112 and the static drum 116. That is, transfer sheave 114 permits transfer of the cable 110 from drum 112 to drum 116 or vice versa, no matter if either drum is full, empty or partially filled with layers of cable wound or reeled thereon. The transfer sheave 114 is offset with respect to the axis of rotation of arm 122 and drum 112, i.e., the axis of rotation of drum 112 and arm 122 is not co-planar with the radial plane of sheave 114, so that when the rotatable drum 112 is driven in the direction designated A, the cable 110 tends to reel from the static drum 116 onto the rotatable drum 112. Thus, in each of FIGS. 1, 2 and 6, the first direction of rotation of the rotatable drum is clockwise when viewed from the right end of shaft 102, and in each case the transfer sheave 114 is positioned with its radial plane to the right of the axis of shaft 102 when viewed from the right end of the shaft.

Driving means for the arm 122 is arranged so that the arm is mounted for rotation in either direction about the axis of rotation of the rotatable drum 112. Generally speaking, and leaving aside any consideration of cable tension—or indeed, considering for the moment that no cable is wound on drums 112 and 116 and over sheave 114—the driving means for the arm 122 is such that when the rotatable drum 112 is driven in the first Direction A, arm 122 tends not to rotate about the axis of the shaft 102; and when the rotatable drum 112 is driven in the second Direction B, arm 122 tends to rotate in the same Direction B and at the same rotational speed as the speed at which the rotatable drum 112 is being driven. However, as noted hereafter, friction means are employed together with the tension of the cable 110 as it passes over the sheave 114 between drums 112 and 116 so that cable transfer between the drums 112 and 116 is effected, as discussed in greater detail hereafter.

Speaking again in general terms, there is friction means which co-acts between the arm 122 and the rotatable drum 112 so that when the drum 112 is driven in the first Direction A, the friction means acts to maintain tension in the cable 110 which passes over the transfer sheave 114, so as to cause the arm 122 to rotate about the axis of shaft 102 in the first Direction A. When the rotatable drum 112 is driven in the second Direction B, the friction means acts together with the tension in cable 110 as it passes over the transfer sheave 114 to retard the speed of rotation of the arm 122 in the second Direction B. The friction means for each of the three major embodiments illustrated in the drawings is discussed hereafter.

Figure 9:
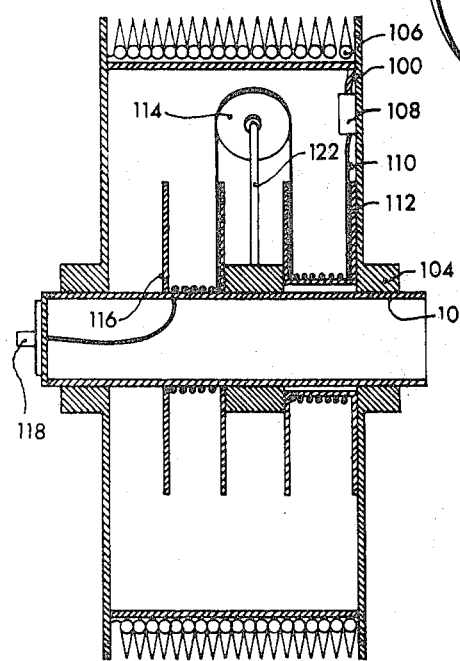
FIG. 9 (found with FIG. 1) is a cross-sectional view of a typical winch drum, and showing a generalized cable transfer mechanism according to this invention installed in the interior thereof.

Referring to FIG. 9, a generalized view of a cable transfer mechanism in accordance with the present invention is shown; and the cable transfer apparatus is shown to be installe in the interior of a cable winch. The winch drum is indicated at 100, and is rotatably mounted with bearings 104 on static shaft 102. A cable, such as faired cable 106, may be stored on the winch drum 100; and one end of that cable—there being a submersible, towed body or other apparatus at the other end of the cable 106—is terminated at a suitable junction box 108 which is secured to the winch drum 100. Suitable drive means for the winch drum are provided, and are not shown. A signal cable 110 is stored in the apparatus according to the present invention, on drums 112 and 116. As noted above, drum 112 is a driven rotatable drum, and is secured in driving relationship to the winch drum 100. The drum 116 is secured to the static shaft 102. The cable 110 terminates at end 118. There is a sufficient length of cable 110 stored on the drums 116 and/or 112 so that there may be a transfer from drum 112 to 116 or vice versa as all of cable 106 is reeled or unreeled from winch drum 100, whichever may be the case. Thus, so long as there is sufficient storage capacity for cable 110 on drums 112 or 116, sufficient cable 110 may be stored to completely accommodate an all-out unreeling of cable 106 or an all-in reeling of that cable onto the winch drum 100; and thus there is no finite limitation upon the number of revolutions that the winch drum 100 or the rotatable drum 112 which is secured in driving relationship thereto may make without reversal of the direction of drive, at least so far as the installed length of cable 110 is concerned. Also, unlike prior devices as discussed above, there is no finite limitation because of spring loading or the length of a spring and the number of times which its active end may be wound. The winch drum 100 may be of the sort which is taught in Hale U.S. Pat. No. 3,576,295 issued Apr. 27, 1971 for "Means for Stowing Crush-sensitive Cable Configurations," or of the sort shown in Hale et al. U.S. Pat. No. 3,604,387 issued Sept. 14, 1971 for "Means for Launching, Towing and Recovering an Oceanographic Towed Body in a Seaway," both of which patents are assigned to a common assignee with the present application.

First Embodiment

The embodiment of FIG. 1—while not the most preferred embodiment of the cable transfer apparatus according to this invention—is the embodiment which most clearly illustrates the principles involved in this invention as discussed above. In summary, driven rotatable drum 112 is mounted on a static shaft 102, to which is secured a static drum 116. Arm 122 is rotatably supported by such as bearing means 121 on the shaft 102, and a transfer sheave 114 is mounted at the outer end of the arm 122; in this case, on a stub shaft 124 by suitable bearing means 125. The arrangement is such that, when the drum 112 is driven in Direction A, cable 110 is transferred from the static drum 116 to drum 112; and vice versa when the drum 112 is driven in the Direction B.

A plate which extends radially outwardly from the shaft 102 is rotatably mounted thereon. A clutch 126 is situated between the rotatable drum 112 and plate 120, and clutch 126 operates so as to lock the plate 120 for rotation with drum 112 when the drum 112 is driven in Direction B, and so that drum 112 rotates without driving the plate 120 when the drum is driven in Direction A. Similarly, a clutch 128 is located between the plate 120 and shaft 102, and operates to lock the plate 120 to the shaft 102 to preclude rotation of the plate 120 when the drum 112 is driven in Direction A, and so as to permit rotation of plate 120 when drum 112 is driven in Direction B.

An arm 127 extends from arm 122, and supports a pair of friction pads 130 which provide frictional coupling between the plate 120 and arm 122. The degree of frictional coupling between the arm 122 and plate 120 may be adjusted at 132 by adjusting the pressure of the pad 130 against the plate 120.

Referring now to FIG. 1, it is convenient to assume first that if the arm 122 and plate 120 were clamped to preclude rotation so as to remain the positions indicated in FIG. 1, and drum 112 were driven in Direction A, there would be a tendency to wind cable 110 onto the drum 112. Similarly, with the other conditions being the same, when drum 112 is driven in Direction B, there would be a tendency to unwind or drive-off cable 110 from the drum 112. However, it is obvious that there would, in fact, be no reeling or transfer of cable 110 to or from drums 112 and 116 when the arm 122 is locked. Thus, the plate 120 and clutches 126 and 128 provide the driving means for the arm 122 and friction means between arm 122 and the rotatable drum 112 so as to effect transfer of cable 110 to or from drum 112 and drum 116, depending on the direction in which drum 112 is being driven.

Assume that drum 112 is driven in Direction B. Clutch 126 locks plate 120 for rotation with drum 112, so that they rotate at the same speed. The friction coupling between plate 120 and arm 122 is effected through the friction pads 130, and that couple attempts to drive the arm 122 and transfer sheave 114 about the axis of shaft 102 in Direction B at the same speed as drum 112 and plate 120 are rotating. However, it is the purpose of the apparatus to transfer cable 110 from drum 112 to drum 116 (with drum 112 being driven in Direction B) and approximately one turn of cable 110 must be transferred or wound from drum 112 for every turn of cable which is wound on drum 116—the precise ratio of turns of cable from drum 112 that is transferred to drum 116 depending at any time on the amount that each of those drums is filled with cable 110. It is seen that drum 112 must therefore drive faster than sheave 114 in Direction B about the axis of shaft 102, and slippage occurs between the friction pads 130 and the plate 120. The force which causes this slippage is the tension in cable 110, and is such that the speed of rotation of the arm 122 and the transfer sheave 114 about the shaft 102 is retarded. When the drums 112 and 116 are approximately equally filled, the speed of rotation of the arm 122 and sheave 114 about shaft 102 in Direction B is approximately one-half of the speed of rotation of drum 112 and plate 120.

A torque which is equal to the tension in the cable 110 multiplied by the radius of the wrapping point of the cable 110 on drum 112 acts in the opposite direction to the direction of rotation of the plate 120, and has the effect that the arm 122 rotates in the same Direction B as the drum 112 is driven, but at approximately half the speed as noted above.

Assuming now that the drum 112 is driven in Direction A, the effect of the apparatus is to transfer cable 110 from the drum 116 to drum 112. In this case, clutch 128 is operative to lock the plate 120 the shaft 102, so that it is non-rotating together with static drum 116. Assuming that there is no cable over the sheave 114 between drums 112 and 116, the arm 122 would tend to remain stationary and to not rotate. However, when cable 110 is accommodated by the transfer sheave 114 between drums 116 and 112, the cable tension tends to drive the sheave 114 and arm 122 in Direction A. Once again, there is a friction coupling between arm 122 and plate 120—which in this case, is stationary—and thus cable tension is maintained in cable 110 as arm 122 is driven in Direction A. Also, when drums 116 and 112 are approximately equally filled, and since each complete revolution of arm 122 in Direction A removes one turn from drum 116—and that turn must be deposited or transferred onto drum 112—the drum 112 must drive at a faster rate than the arm 122; or in other words, the friction couple between the arm 122 and the plate 120 acts to maintain tension in the cable 110 and to drive arm 122 to rotate about shaft 102 in Direction A.

FIG. 9

It can now be seen that the length of the signal cable 110 may be considerably less than the length of cable 106 which is wound on winch drum 100 as shown in FIG. 9. In the first place, only half as many turns are required, because in the average the arm 122 rotates at only half the speed of drum 112 and winch drum 100, in whichever direction they are driven. Also, the average diameter of the drums 112 and 116 is much smaller than the diameter of winch drum 100. Some additional cable 110 must, of course, be provided for "pigtails" from drum 112 to junction box 108 and from drum 116 to terminal 118, and to allow for the length of cable being accommodated between drums 116 and 112 over the transfer sheave 114. This may be expressed by the formula:

$$l = N/2 \times d/D \times L_t + P + T$$

where:
  l is the length of signal cable 110;
  $L_t$ is the length of cable 106 per turn as it is wound on winch drum 100;

N is the number of turns of cable 106 on winch drum 100;

d is the average diameter of drums 112 and 116;

D is the diameter of the winch drum 100;

P is the allowance for pigtails at each end between drums 112 and 116, and junction box 108 and terminal 118, respectively; and T is the allowance for cable accommodated between drums 112 and 116 over the transfer sheave 114.

It should also be noted that the cable 110 may be of considerably smaller diameter than cable 106, because it need only withstand the cable tension within it and the torque generated thereby between transfer sheave 114 and either of the drums 116 and 112. It is therefore relatively easy to place a cable transfer mechanism according to this invention within a winch drum, as shown in FIG. 9.

Second Embodiment

The second, most preferred, embodiment of a cable transfer apparatus according to this invention is shown in FIGS. 2, 3 and 4. Fewer components are required than in the embodiment illustrated in FIG. 1, and yet the same function of that mechanism is accomplished and the same general relationships hole true as to the driving means for the arm 122 and the friction couple between the arm 122 and the rotatable drum 112, as summarized above with respect to the embodiment illustrated in FIG. 1.

The embodiment of FIGS. 2, 3 and 4 includes the driven rotatable drum 112 and a static drum 116, shaft 102, arm 122, transfer sheave 114 and cable 110, all as referred to above. The first and second directions of rotation of the driven drum 112 are indicated at arrows A and B, consistent with the previous discussion with respect to the embodiment of FIG. 1.

A bearing sleeve 200 may be cast or otherwise formed from polyurethane or other suitable material, and the bearing sleeve 200 is mounted for rotation on the static shaft 102. The sleeve is formed with two integral, annular shoulders 202 and 204, the outer circumferential surfaces of which are toothed as indicated in FIGS. 2 and 3 at 206. Pawls 208 and 210 are provided as discussed in greater detail hereafter. Pawl 208 together with toothed shoulder 202 forms a ratchet and pawl; and similarly, pawl 210 together with toothed shoulder 204 forms a ratchet and pawl. The rotatable drum 112 is mounted over the bearing sleeve 200, and is rotatable thereover as discussed hereafter.

The first ratchet and pawl formed by pawl 208 and toothed shoulder 202 is mounted so as to preclude relative rotation of the rotatable drum 112 and the bearing sleeve 200 when the rotatable drum is driven in Direction B. Conveniently, the pawl 208 is supported on the rotatable drum 112. At the same time, the second ratchet and pawl formed by pawl 210 and toothed shoulder 204 are mounted so as to preclude relative rotation of the bearing sleeve 200 and the static drum 116 when the rotatable drum 112 is driven in Direction A. Conveniently, pawl 210 is supported on the static drum 116; and thus the teeth 206 of both toothed shoulders 202 and 204 face in the same direction, as illustrated in FIG. 2.

When rotatable drum 112 is driven in Direction A, pawl 210 engages a tooth 206 of shoulder 204 so that the bearing sleeve 200 remains static together with drum 116, and the drum 112 rotates over the bearing sleeve 200 while the pawl 208 oscillates over the teeth of shoulder 202. The engagement of pawl 210 with one of the teeth 206 of shoulder 204 is illustrated in FIG. 3. When the rotatable drum 112 is driven in Direction B, pawl 208 engages one of the teeth 206 of shoulder 202, and the bearing sleeve 200 rotates with drum 112 over the static shaft 102. The conditions of driving relationship of drum 112 and bearing sleeve 200 with respect to the direction of drive of the drum 112 is identical to the conditions of drum 112 and plate 120 of the embodiment illustrated in FIG. 1.

The transfer sheave 114 is mounted at the end of arm 122 which is rotatably supported on the bearing sleeve 200. The support for the arm 122 may conveniently comprise a split bearing 212; and there is a frictional engagement between the bearing sleeve 200 and bearing 212, with a friction couple indicated at 216 in FIGS. 3 and 4. Means such as bolts 214, by means means assembly of the split bearing 212 may also be achieved, are provided to adjust the force of the friction couple 216.

It can now be appreciated that the operation of the embodiment of FIGS. 2, 3 and 4 is essentially identical to the operation of the embodiment of FIG. 1. That is to say, when rotatable drum 112 is driven in Direction B, a driving torque is manifested by the co-action of the tension in cable 110 and the friction coupling 216 between bearing 212 supporting arm 122 and the rotating bearing sleeve 200, so that the rotational speed of arm 122 in Direction B is reduced below that of the driven speed of drum 112. As noted above, the average rotational speed of arm 122 is approximately one-half of the driven speed of rotation of drum 112. Likewise, when drum 112 is driven in Direction A, and bearing sleeve 200 is precluded from rotation, a torque is imparted by the tension in cable 110 to the arm 122 and slippage occurs at the friction interface 216 between the split bearing 212 and the bearing sleeve 200. The arm 122 again rotates in Direction A with an average speed of approximately one-half the driven speed of drum 112 in Direction A.

The mounting of drums 112 and 116, and the installation of cable 110, may be substantially as spoken of above with respect to the first embodiment illustrated in FIG. 1.

Third Embodiment

A third embodiment of a cable transfer apparatus according to this invention is illustrated in FIGS. 5, 6, 7 and 8. This embodiment is one which may be easily constructed with "off-the-shelf" clutch components, and provides the same cable transfer operation as referred to above with respect to the first two embodiments. Referring to FIG. 6, there is shown a pair of identical clutch assemblies 300 and 302 which are situated at the ends 303 and 305 of an extension 304 of arm 122. The frictional characteristics of the clutch assemblies 300 and 302, as discussed hereafter, are transmitted to drums 112 and 116 respectively by a pair of toothed timing belts 306 and 308 which are driven from first sprockets or timing pulleys 318 on the clutch assemblies 300 and 302. Belts 306 and 308 drive sprockets 307 and 309, which are secured to drums 112 and 116 respectively.

By way of example, FIG. 5 is a schematic illustration of a cross-section of clutch assembly 300. That assembly includes one-half of a friction clutch, indicated at 310, which is keyed to the extension 303, while the mating half 312 of the friction clutch is keyed to a shaft 314. Shaft 314 also carries a "sprag" or overrunning clutch 316, the inner half of which is keyed to the shaft 314 at 315. The outer half of the overrunning clutch 316 supports a timing pulley or sprocket 318. It will be seen that the timing pulley 318 is free to rotate in one direction by the overrunning clutch 316, and that in the opposite direction clutch 316 locks so that for rotation of the pulley 318 to take place, shaft 314 must turn. When shaft 314 turns, frictional slippage occurs between the mating halves 310 and 312 of the friction clutch. Thus, the timing pulley or sprocket 318 is free to turn in one direction without encountering any frictional resistance, but in the other direction of rotation the timing pulley or sprocket 318 turns against a frictional resistance.

Clutch assembly 302 is similarly mounted, and has frictional and overrunning operations in opposite directions to those of the clutch assembly 300, as discussed hereafter.

Referring now to FIG. 7, a schematic representation is made showing the operation of the apparatus of FIG. 6 when the rotatable drum 112 is driven in Direction B. (It should be noted that Direction B is counterclockwise when viewed from the right end of shaft 102, consistent with the previous discussion with respect to the first two embodiments of the present invention.) With drum 112 being driven in Direction B, the overrunning clutch 316 of clutch assembly 300 locks, and the arm 122 tends to try to rotate in Direction B at the same speed. However, because cable is being transferred from drum 112 to drum 116, and as discussed above, the transfer sheave 112 rotates about shaft 102 with arm 122 at about half the speed of rotation of drum 112. The clutch assembly 300 must therefore rotate in order to permit the toothed belt 306 to drive past the sprocket 318. A frictional restraint is encountered between the clutch halves 312 and 310 of the friction clutch, thereby controlling the winding tension in cable 110. Obviously, clutch assembly 302 is overrunning so that the sprocket 318 of that assembly turns without resistance, and there is no contribution by the clutch assembly 302 to the functional operation of the transfer mechanism when the rotatable drum 112 is driven in Direction B.

With rotatable drum 112 being driven in Direction A, as illustrated schedmatically in FIG. 8, the overrunning clutch component 316 of clutch assembly 302 locks. Since the toothed belt 308 drives between sprockets 318 of clutch assembly 302 and sprocket 309 which is secured to the static drum 116, the arm 122 tends to not rotate. However, because the cable 110 is being transferred from static drum 116 to the rotatable drum 112 under tension, once again the arm 122 is forced to rotate about shaft 102 at approximately half of the driven speed of drum 112. Therefore, the sprocket 318 of clutch assembly 302 must rotate against the frictional couple between halves 310 and 312 of the friction clutch component of clutch assembly 302. Clutch assembly 300 is overrunning, and does not contribute to the functional operation when the rotatable drum 112 is driven in Direction A.

It will be seen that the friction couple in the embodiment of FIGS. 5 to 8 comprises the coupling between halves of either of the clutch assemblies 300 or 302, being the clutch assembly which, at that time, is not overrunning at the overrunning clutch component thereof.

There has been described an apparatus for transferring cable between a driven rotatable drum and a static drum, having three embodiments all of which encompass basic principles common to this invention. Those principles are that the arm at the outer end of which a transfer sheave is mounted is such that it tends not to rotate about the common axis of it and the rotatable drum when the rotatable drum is driven in a first direction, and that the arm tends to rotate in the second direction, and at the same speed of rotation, when the rotatable drum is driven in the second direction. Friction means co-act between the arm and the rotatable drum so that when the rotatable drum is driven in the first direction, the friction means acts to maintain tension in the cable passing over the transfer sheave and to cause the arm to rotate in that first direction, but when the rotatable drum is driven in the second direction, the friction means acts together with the tension in that second direction. It has been noted that the cable transfer apparatus of this invention may be installed in the interior of such apparatus as a winch drum in oceanographic or other system installations.

It should be noted that in certain circumstances, the transfer sheave may be replaced with other suitable cable transfer guides having appropriate frictional characteristics with respect to the cable passing thereover. Further, in some circumstances, it is convenient to physically install a friction device to provide the friction couple 216 of the embodiment illustrated in FIGS. 2, 3 and 4. Such a device may be such as a brake shoe or drum, or a combination of them, attached to the bearing sleeve 200, split bearing 212, or both. Also, the shoulders 202 and 204 of the bearing sleeve 200 of that same embodiment may be separately formed of the same, or different, materials as the bearing sleeve, and keyed or otherwise secured to the sleeve.

Finally, it has been noted that, while the cable transfer mechanism of the present invention is particularly adapted for use with electrical cable which may be carrying a plurality of low voltage, low current signals, it is also adaptable for use with lines which carry gas or liquid samples, or hybrids which may include such samples together with electrical signals; and high power signals having high voltage or high current, or both.

It is not intended that the preceding discussion be limiting with respect to the invention described herein, but illustrative of the principles and concepts involved.

We claim:

1. In an apparatus for transferring cable between a driven rotatable drum and an undriven static drum, where said drums are positioned along a common axis, and where the axis of rotation of said rotatable drum is substantially co-extensive with said common axis; the transfer of cable being such that cable is transferred from said static drum to said rotatable drum when said rotatable drum is driven in a first direction of rotation, and from said rotatable drum to said static drum when said rotatable drum is driven in a second, reverse, direction of rotation; the combination comprising:

a. first arm means extending in a direction substantially perpendicular to said common axis;
   b. transfer sheave means mounted for rotation at the outer end of said first arm means, the radial plane of said transfer sheave means being substantially parallel to said common axis;

c. said transfer sheave means being mounted so as to accommodate cable as it is being transferred between said rotatable drum and said static drum, and being positioned so that when said rotatable drum is driven in said first direction cable tends to reel from said static drum onto said rotatable drum;

d. driving means for said first arm means including means mounting said first arm means for rotation in either direction about said axis of rotation of said rotatable drum; said driving means being such that when said rotatable drum is driven in said first direction of rotation said first arm means tends to not rotate about said common axis, and when said rotatable drum is driven in said secod direction of rotation said first arm means also tends to rotate in said second direction at the same rotational speed as the rotation of said rotatable drum; and e. friction means co-acting between said first arm means and said rotatable drum such that when said rotatable drum is driven in said first direction of rotation, said friction means acts to maintain tension in said cable passing over said transfer sheave mounted at the outer end of said first arm means; and to cause said first arm means to rotate about said axis of rotation in said first direction; and such that when said rotatable drum is driven in said second direction of rotation, said friction means acts together with the tension in said cable passing over said transfer sheave to retard the speed of rotation in said second direction of said first arm means about said axis of rotation.

2. The apparatus of claim 1 wherein said first arm means and said rotatable drum are each mounted for rotation on a static shaft, and said static drum is secured to said static shaft.

3. The apparatus of claim 2 where said driving means for said first arm means includes: a bearing sleeve mounted for rotation on said static shaft and on which said rotatable drum is rotatably mounted; first ratchet and pawl means mounted between said bearing sleeve and said rotatable drum to preclude relative rotation therebetween when said rotatable drum is driven in said second direction; second ratchet and pawl means mounted between said bearing sleeve and said static drum to preclude relative rotation therebetween when said rotatable drum is driven in said first direction; and means rotatably supporting said first arm means on said bearing sleeve; said friction means comprising a friction coupling between said means rotatably supporting said first arm means and said bearing sleeve.

4. The apparatus of claim 3 where said first and second ratchet and pawl means are mounted with said pawls supported on said rotatable drum and said static drum, respectively.

5. The apparatus of claim 3 including means for adjusting the friction coupling between said means rotatably supporting said first arm means and said bearing sleeve.

6. The apparatus of claim 2 where said driving means for said first arm means includes: plate means rotatably mounted on said static shaft and extending radially outwardly therefrom; first clutch means between said rotatable drum and said plate means for locking said plate means for rotation with said rotatable drum when said rotatable drum is driven in said second direction; and second clutch means between said plate means and said static shaft for locking said plate means to said shaft to preclude rotation thereof when said rotatable drum is driven in said first direction; and means rotatably supporting said first arm means on said static shaft; said friction means comprising pad means frictionally coupled to said plate means and secured to said first arm means for rotation therewith.

7. The apparatus of claim 6 including means for adjusting the friction coupling between said pad means and said plate means.

8. The apparatus of claim 2 where said driving means for said first arm means includes: first and second clutch means mounted on first and second extensions of said first arm means, respectively, each including friction clutch means and overrunning clutch means; said first and second clutch means being mounted for frictional and overrunning operation in opposite directions to one another; first sprocket means mounted with each of said rotatable drum and said static drum, a timing belt between said first sprocket and said first clutch means and said second sprocket on said rotatable drum, and a timing belt between said first sprocket on said second clutch means and said second sprocket on said static drum; and means rotatably supporting said first arm means on said static shaft; said friction means comprising said friction clutch portions of each of said first and second clutch means.

9. The apparatus of claim 2, further including: winch drum means mounted exteriorly of said rotatable and static drums and said first arm means; said winch drum being secured in driving relationship to said rotatable drum and being rotatably mounted on said static shaft.

10. The apparatus of claim 9 where said cable is adapted for the electrical transfer of signal voltages impressed thereon.

* * * * *